(12) United States Patent
Day et al.

(10) Patent No.: US 6,979,261 B1
(45) Date of Patent: Dec. 27, 2005

(54) DUST REDUCING AIRFLOW DIVERTER FOR COMBINE

(75) Inventors: Robert Lee Day, Port Byron, IL (US); Brian Mark Lobdell, Cambridge, IL (US); Corwin Marcus Raymond Puryk, East Moline, IL (US); Janet Rose Maas, Moline, IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/966,935

(22) Filed: Oct. 15, 2004

(51) Int. Cl.[7] .............................................. A01F 12/54
(52) U.S. Cl. ......................... 460/59; 460/16; 460/117
(58) Field of Search .............................. 460/59, 73, 72, 460/16, 117

(56) References Cited

U.S. PATENT DOCUMENTS

| | | | |
|---|---|---|---|
| 3,094,829 A | * 6/1963 | Reinhold | 56/13.3 |
| 3,213,598 A | * 10/1965 | Olsson | 56/13.3 |
| 3,669,124 A | 6/1972 | De Coene et al. | 460/59 |
| 4,501,282 A | * 2/1985 | Muller et al. | 460/114 |
| 4,753,296 A | * 6/1988 | Kruithoff | 171/26 |
| 5,322,472 A | * 6/1994 | Little | 460/117 |
| 5,368,522 A | * 11/1994 | Ricketts et al. | 460/16 |
| 5,733,192 A | * 3/1998 | Jones | 460/113 |
| 6,036,600 A | 3/2000 | Kruckman | 460/117 |
| 6,193,772 B1 | * 2/2001 | Wiefel | 55/283 |

* cited by examiner

*Primary Examiner*—Meredith Petravick

(57) ABSTRACT

An agricultural combine for harvesting, threshing and separating an agricultural crop includes a processing assembly. A conveying mechanism moves harvested crop material to the crop processing assembly. A rotating member feeds crop material from the conveying mechanism to the processing assembly. An airflow diverter is transversely positioned adjacent the rotating member to divert a potion of the airflow from the conveying mechanism into the crop processing assembly independent of the crop flow path.

7 Claims, 4 Drawing Sheets

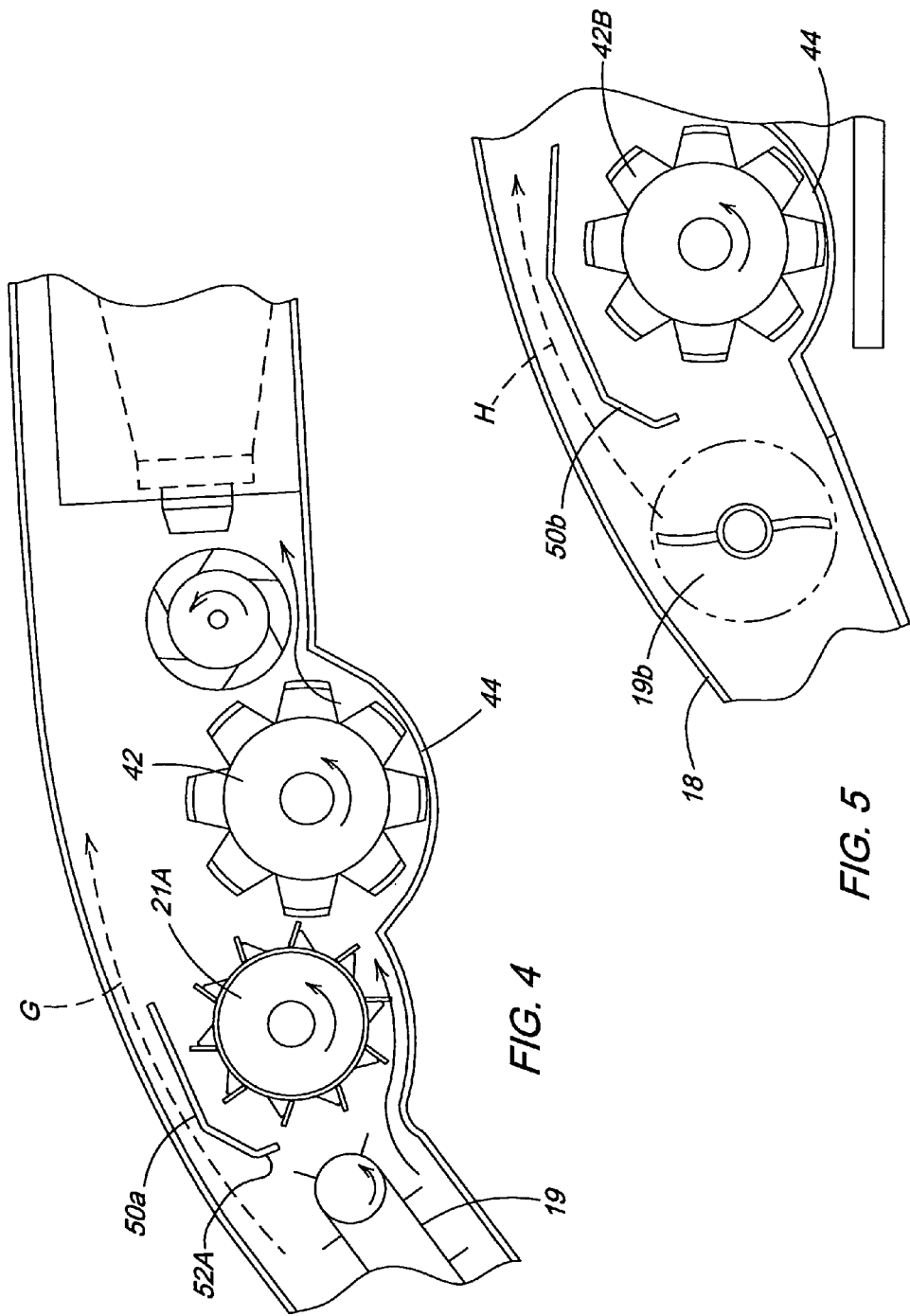

DUST REDUCING AIRFLOW DIVERTER FOR COMBINE

FIELD OF THE INVENTION

The present invention is directed to an airflow diverter for an agricultural combine to assist airflow from the feeder house to flow through the processing area and reduce dust escaping at the front of the combine.

BACKGROUND OF THE INVENTION

Agricultural combines are large machines that harvest, thresh, separate and clean an agricultural crop. The resulting clean grain is stored in a grain tank located on the combine. The residual crop material, or material other than grain, is discharged from the rear of the combine. Since the residual material includes dust and other small crop particulate, it is preferable to discharge the residual material away from the field of vision of the operator cab.

A harvesting platform is located at the front of the combine and harvests the crop. The harvested crop is directed to a feeder house for delivering the crop material to a crop processing assembly. The operator cab is generally positioned above the feeder house. The harvesting, conveying and processing of the crop material produces significant dust and small particle debris in the feeder house and processing assembly.

The crop material is threshed and separated into grain in the processing assembly. The crop processing assembly includes either a conventional transverse threshing cylinder and concave or a rotary threshing assembly. The rotary threshing assembly may be arranged axially or transversely. Another transverse rotating member, such as a feed beater or feed accelerator, usually assists movement of crop material from the feeder house into either the transverse or axial processing assembly.

A feed beater or accelerator is a rotating cylinder with transverse wings and controls the feeding of crop material into the crop processing assembly. A feed beater can be used with a transversely aligned conventional cylinder or with an axially or transversely aligned rotor. An undershot feed beater typically pulls the crop under the rotating beater using the transverse wings and pushes the crop into the inlet section of the crop processing assembly. As such, the returning wings, rotating along the top circumference of the beater, act as a fan and can push air back into the feeder house (i.e. forward relative to the rearward direction of movement of the crop material). This reverse or backward airflow can create turbulence or an airflow stall or air lock with the incoming airflow at the feeder house. These situations can cause the airflow in the feeder house to escape from the top or sides of the feeder house. The discharged air usually contains dust and small crop particulate from the harvesting process and, under certain operating conditions, can limit the field of vision from the operator cab.

In an effort to reduce feeder house dust from the operator cab field of vision, integral fans have been added to the feeder house to discharge air and dust out the sides or bottom of the feeder house. See for example the John Deere Air Flow system. Alternatively, an add-on attachment is available. See U.S. Pat. No. 6,036,600. In another alternatively, integral fans are added to the crop processing area to create additional airflow to pull the air and dust from the feeder house and through the combine. While these solutions may reduce dust, they also increase mechanical complexity, and thus cost and maintenance of combines and may reduce the power available for harvesting.

SUMMARY OF THE INVENTION

The present invention provides a simple and effective air diverting system for providing airflow through an agricultural combine.

An agricultural combine for harvesting, threshing and separating an agricultural crop includes a support system supporting a processing assembly. A conveying mechanism is provided for moving crop material from the harvesting platform to the crop processing assembly. A rotating member, such as an undershot beater or feed accelerator, feeds crop material from the conveying mechanism to the crop processing assembly. An airflow diverter is provided proximate to the rotating member to divert airflow from the conveying mechanism to the processing assembly.

In one configuration, the rotating member can be an undershot feed beater used with an axial rotor or with a conventional threshing cylinder. In another configuration, the rotating member can be the conventional threshing cylinder.

In a further embodiment, a deflector portion is provided on the airflow diverter to deflect airflow from the rotating member in a direction away from the incoming airflow.

BRIEF DESCRIPTION OF THE DRAWINGS

FIG. 4 is a schematic view showing an air diverting system according to the present invention in a conventional transverse cylinder combine having a feed beater.

FIG. 5 is a schematic view showing an air diverting system according to the present invention in another transverse cylinder combine.

DESCRIPTION OF THE PREFERRED EMBODIMENT

Figure 1:
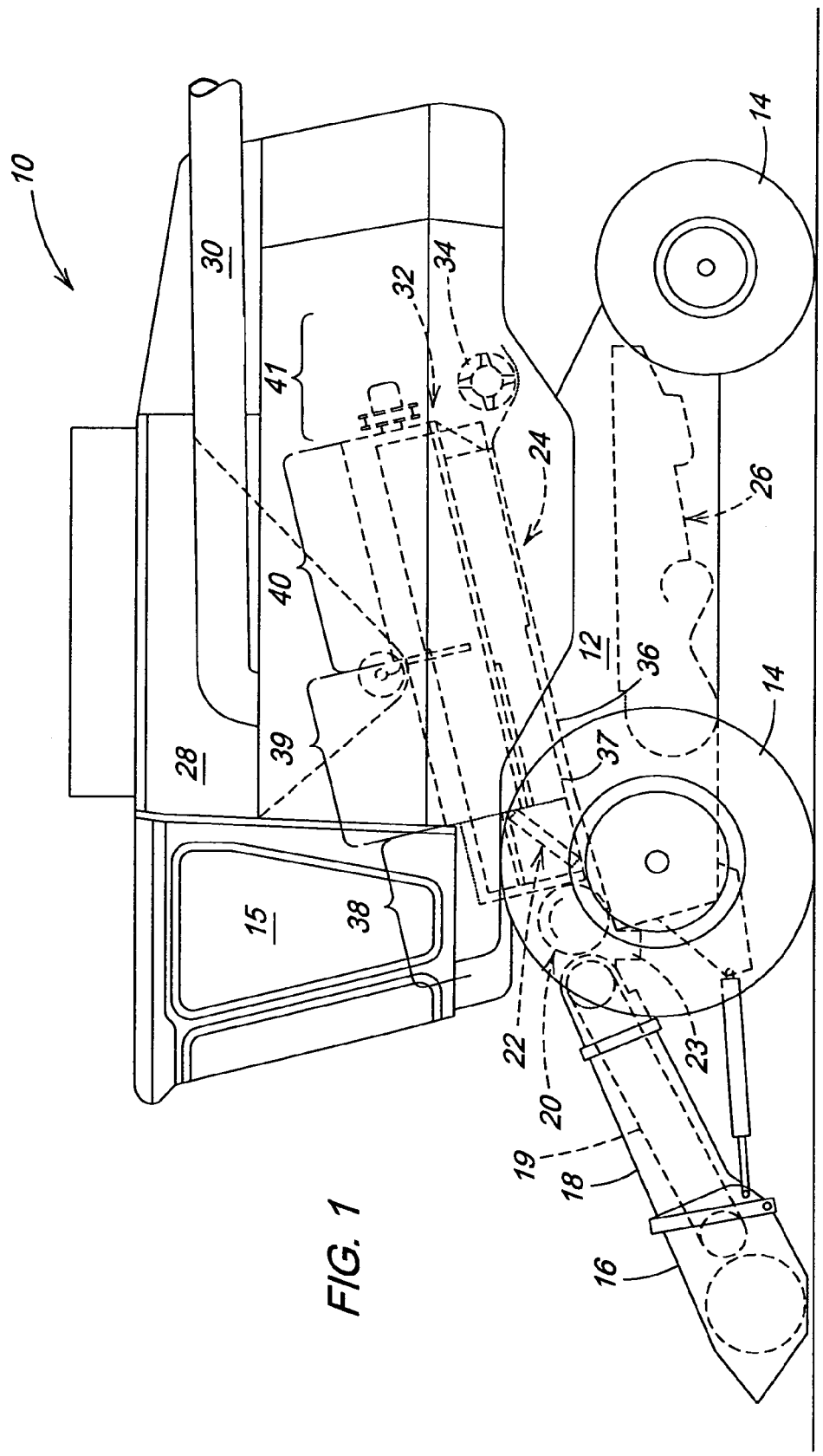
FIG. 1 is a semi-schematic side view of an agricultural combine.

FIG. 1 shows an agricultural combine 10 having a supporting structure 12 and ground engaging wheels 14 extending from the supporting structure, although the combine could alternatively have ground engaging tracks. The operation of the combine is controlled from the operator cab 15.

A harvesting platform 16 is used for harvesting a crop and directing it to a feeder house 18. The feeder house 18 contains a conveying mechanism 19 for conveying the harvested crop to the inlet of a processing assembly 24. A rotating member 20, such as a rotating beater, feeds crop material through an inlet section 22 to the crop processing assembly 24. The crop processing assembly illustrated in FIG. 1 is a rotary threshing and separating assembly and is axially arranged in the combine 10. Alternatively, the crop processing assembly could be configured in a transverse orientation relative to the longitudinal axis of the combine, as shown in other embodiments. Thus, although the present invention is primarily described and illustrated as being used in a combine having an axial rotor assembly, the present invention can also be used in a combine having a conventional transverse threshing cylinder and concave assembly or in a transverse rotor assembly.

The crop processing assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28 which can be unloaded by unloading auger 30.

The residual crop material that has been threshed and separated is discharged from the crop assembly unit through outlet 32 to a discharge beater 34. The discharge beater in turn propels the residual crop material out the rear of the combine. The discharge beater 34 could alternatively discharge residual crop material to a straw chopper, for example.

The axial rotor crop processing assembly 24 in FIG. 1 includes a cylindrical rotor housing 36 and an axial rotor 37 located inside the housing 36. The front part of the rotor and the rotor housing define the infeed section 38. Downstream from the infeed section 38 are the threshing section 39, the separating section 40 and the discharge section 41.

Figure 2:
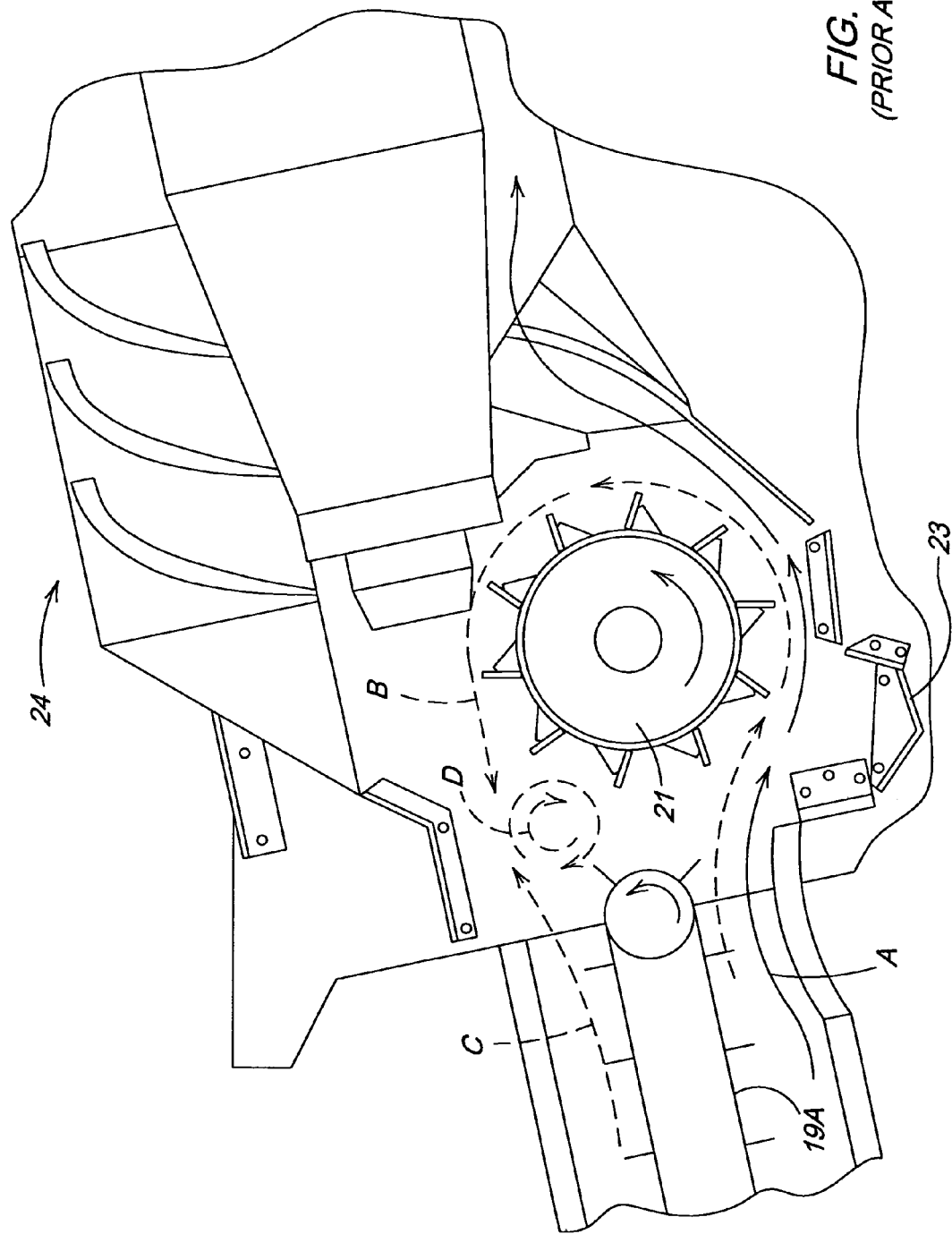
FIG. 2 is a schematic view showing the airflow in a prior art combine.

Referring to FIG. 2, the crop conveying mechanism in the feeder house 18 may be a chain conveyor 19A having transversely extending slats located between the drive chains. Alternatively, (in FIG. 5) the conveying mechanism may include a series of transverse beaters 19B having paddles or an axial auger or augers. In known combine configurations, a rotating member 20 is transversely mounted downstream of the conveying mechanism 19 and forward of the crop processing inlet 22. An undershot feed beater or feed accelerator 21 is shown in FIG. 2 and has rotating transverse wings that move crop material from the feeder house 18 into the crop processing assembly 24, as shown by arrow A. A stone trap 23 is provided under the rotating member.

In certain harvesting conditions, the rotating member, such as the undershot feed beater 21, can create an undesirable reversed air flow in the feeder house. As the member 21 rotates, airflow is directed back toward the feeder house by the motion of the returning wings, as shown by arrow B in FIG. 2. When the reversed airflow generated by the rotating beater meets another portion of the incoming airflow (arrow C) from the feeder house, an area of turbulence (area D) is created. In certain operating conditions, the turbulence can result in an air lock or air stall at the feeder house. In these situations, dust and crop particulate can be forced out or escape from the feeder house and into the field of vision from the operator cab 15.

Figure 3:
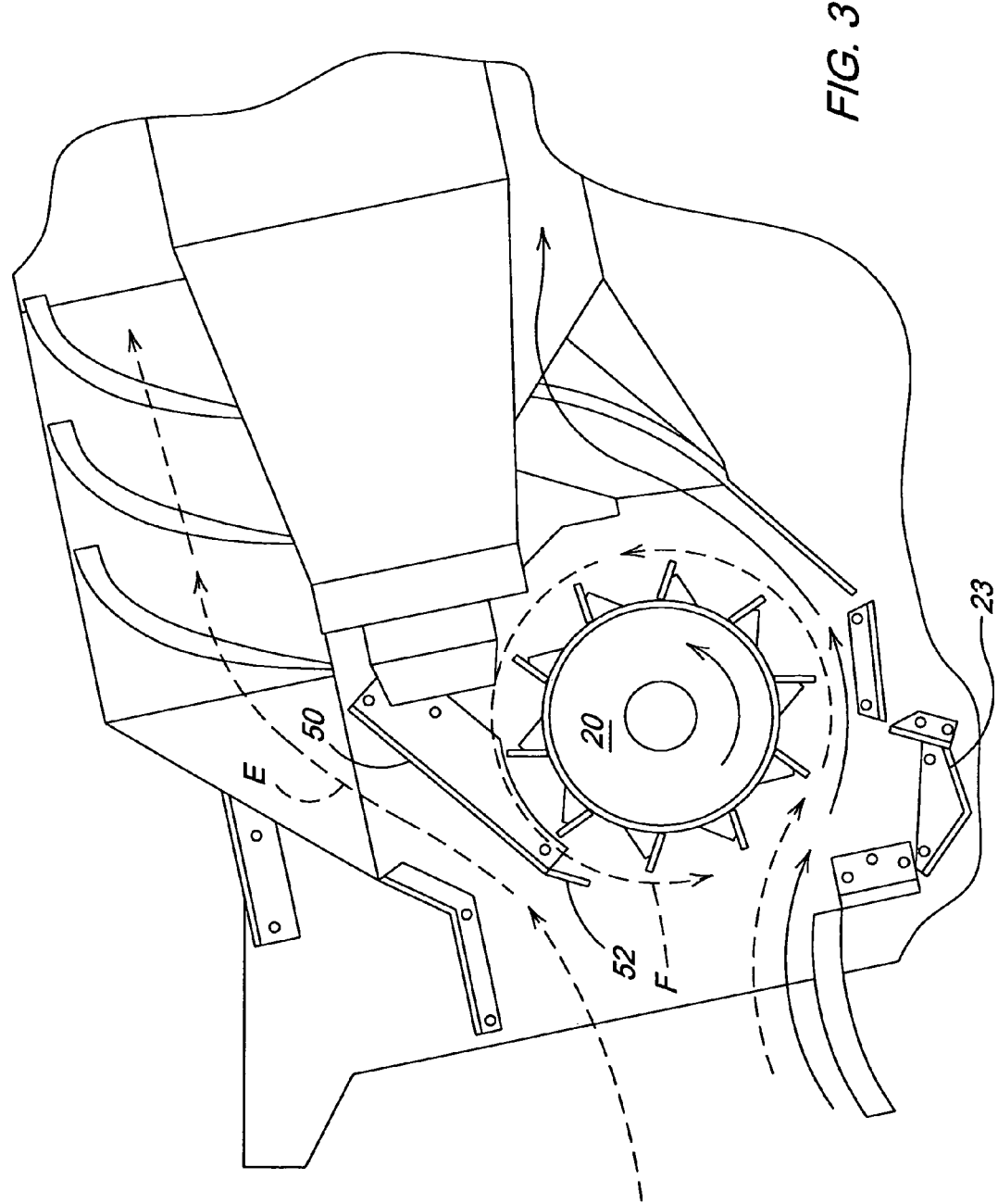
FIG. 3 is a schematic view showing an air diverting system according to the present invention in an axial rotor combine.

As shown in FIG. 3, an air diverter member 50 is mounted transversely across the infeed section 38 and upstream (i.e. forward) of the processing assembly 24 to reduce air flow conditions that could cause an air stall. The air diverter is positioned generally tangential to and offset (i.e. over) relative to the rotating member 20. The air diverter is supported on opposite sides of the processing assembly so as to create an opening into the top of the processing assembly 24 and thereby define an air flow path separate and independent from the crop flow path into the processing area. Because the air diverter 50 is located proximate to and over the rotating member 20, a portion of the incoming airflow, shown by arrow E, is diverted above the diverter member 50 and into the crop processing area 24.

The diverted air (arrow E) is drawn and pulled through the combine 10 partially by the fan action of the rotating processing assembly 24, whether the processor is an axial rotor, a transverse rotor or a transverse cylinder. Dust and particulate from the crop harvesting and feeding functions are pulled through both the feeder house 18 and crop processing assembly 24 and discharged from the rear of the combine without the use of extra fans or moving parts. The leading edge of the air diverter member is located above and tangentially offset from the rotating member 20. A deflector 52 on the leading edge of the air diverter 50 further reduces the potential back flow of air (arrow F) from the rotating member 20 toward the feeder house 18.

As shown in FIG. 4, the air diverter can also be used with an alternate transverse configuration of a crop processing assembly 24. A conventional threshing combine generally has a transverse threshing cylinder 42 and concave 44 fed by a transverse rotating member, such as an undershot beater 21A. An air diverter 50A is transversely mounted above the beater 21A to allow a diverted airflow (arrow G) over the rotating member and through the combine. A deflector 52A on the leading edge of the air diverter further reduces the back flow of air from the rotating member.

FIG. 5 shows another configuration of a transverse threshing cylinder. The feeder house conveying mechanism includes at least one rotating beater 19B, having paddles rather than a chain conveyor. As shown, there is no additional feed beater between the feeder house conveyor and the crop processing assembly. However, the transversely mounted and rotating threshing cylinder 42B acts like a fan and can create reverse flow turbulence with the incoming airflow. When the incoming airflow from the feeder house 18 is disrupted or stalled, dust and particulate can escape from the feeder house, as previously described. An air diverter 50B according to the invention is transversely mounted above the rotating threshing cylinder 42B and diverts a portion of the incoming airflow (arrow H) from the feeder house 18 around the transversely aligned, rotating crop processing member 42B.

Thus, in the conventional threshing cylinders of FIGS. 4 and 5, the diverted portion of the incoming airflow by-passes a portion of the crop processing assembly without circulating around the rotating member. The air diverters 50A and 50B reduce the flow of air reversed off the returning blades of the rotating member. The smaller volume of reversed airflow does not disrupt or stall the incoming airflow. Thus, under certain operating conditions, a turbulent airflow in or at the feeder house that could cause dust and dirty air to escape or be discharged from the feeder house in the field of vision of the operator cab is avoided.

The airflow diverters 50, 50A and 50B shown in FIGS. 3, 4 and 5 divert a portion of the incoming airflow past a rotating member, on a path separate and independent from the crop flow path, through the combine. The diverted airflow (E, G and H) reduces turbulence and air stalls in the combine that occur under certain operating conditions. Reducing these undesirable air stalls in or at the combine feeder house reduces the amount of dust and crop particulate that is discharged from the feeder house that could limit the field of vision from the operator cab.

Having described the preferred embodiment, it will become apparent that various modifications can be made without departing from the scope of the invention as defined in the accompanying claims.

What is claimed is:

1. An agricultural combine for harvesting, threshing and separating an agricultural crop, the agricultural combine comprising:
   a crop processing assembly having an axial rotor;
   a conveying mechanism for moving harvested crop material to the crop processing assembly;

a rotating beater between the conveying mechanism and the axial rotor for feeding crop material from the conveying mechanism to the axial rotor along a crop flow path;

a transverse airflow diverter adjacent the rotating beater to divert a portion of the airflow from the conveying mechanism into the processing assembly on a path separate from the crop flow path.

2. The agricultural combine as defined by claim 1 wherein the rotating beater is an undershot feed beater.

3. The agricultural combine as defined by claim 1 wherein the conveying mechanism is a feeder house.

4. The agricultural combine as defined by claim 1 wherein the airflow diverter has a leading edge positioned radially offset from the rotating beater and generally above and tangential to the rotating beater.

5. The agricultural combine as defined by claim 4 wherein the airflow diverter further comprises a deflector on the leading edge for directing airflow from the rotating beater away from the airflow diverted to the axial rotor assembly.

6. A method for reducing dust escaping from the front end of an agricultural combine, the combine having a crop processing assembly and a rotating member for moving crop material along a crop flow path to the processing assembly, the method comprising:

feeding crop material into the processing assembly along a crop flow path; and diverting a portion of the airflow from the front end of the combine to the processing assembly on a path separate from the crop flow path.

7. The method as defined by claim 6 further comprising deflecting a reversed airflow generated by the rotating member away from the diverted airflow.

* * * * *